(12) United States Patent
Kato et al.

(10) Patent No.: US 8,632,014 B2
(45) Date of Patent: *Jan. 21, 2014

(54) WIRELESS IC DEVICE

(75) Inventors: Noboru Kato, Moriyama (JP); Yuya Dokai, Nagaokakyo (JP); Nobuo Ikemoto, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 737 days.

This patent is subject to a terminal disclaimer.

(21) Appl. No.: 12/510,347

(22) Filed: Jul. 28, 2009

(65) Prior Publication Data

US 2009/0277967 A1    Nov. 12, 2009

Related U.S. Application Data

(63) Continuation of application No. PCT/JP2008/057239, filed on Apr. 14, 2008.

(30) Foreign Application Priority Data

Apr. 27, 2007   (JP) ................... 2007-120249

(51) Int. Cl.
   *G06K 19/06*   (2006.01)
(52) U.S. Cl.
   USPC ........................................... 235/492
(58) Field of Classification Search
   USPC ........................................... 235/492
   See application file for complete search history.

(56) References Cited

U.S. PATENT DOCUMENTS

| | | |
|---|---|---|
| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,717,231 A * | 2/1998 | Tserng et al. ............ 257/276 |
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |

(Continued)

FOREIGN PATENT DOCUMENTS

| | | |
|---|---|---|
| EP | 0 694 874 A2 | 1/1996 |
| EP | 0 977 145 A2 | 2/2000 |

(Continued)

OTHER PUBLICATIONS

Official communication issued in Japanese Application No. 2007-531524, mailed on Sep. 11, 2007.

(Continued)

*Primary Examiner* — Michael G Lee
*Assistant Examiner* — David Tardif
(74) *Attorney, Agent, or Firm* — Keating & Bennett, LLP

(57) ABSTRACT

A wireless IC device includes a radiating plate, a wireless IC chip, and a feeder circuit board, on which the wireless IC chip is mounted. The feeder circuit board includes a resonant circuit with an inductance element, and the resonant circuit is electromagnetically coupled with the radiating plate. The wireless IC chip is interposed between the radiating plate and the feeder circuit board.

17 Claims, 3 Drawing Sheets

(56) References Cited

U.S. PATENT DOCUMENTS

| | | | |
|---|---|---|---|
| 5,955,723 A | 9/1999 | Reiner | |
| 5,995,006 A | 11/1999 | Walsh | |
| 6,104,311 A | 8/2000 | Lastinger | |
| 6,107,920 A | 8/2000 | Eberhardt et al. | |
| 6,172,608 B1 | 1/2001 | Cole | |
| 6,181,287 B1* | 1/2001 | Beigel | 343/741 |
| 6,190,942 B1 | 2/2001 | Wilm et al. | |
| 6,259,369 B1 | 7/2001 | Monico | |
| 6,271,803 B1 | 8/2001 | Watanabe et al. | |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1* | 4/2002 | Emori et al. | 235/492 |
| 6,406,990 B1 | 6/2002 | Kawai | |
| 6,448,874 B1 | 9/2002 | Shiino et al. | |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,828,881 B2 | 12/2004 | Mizutani et al. | |
| 6,927,738 B2 | 8/2005 | Senba et al. | |
| 6,963,729 B2 | 11/2005 | Uozumi | |
| 7,088,307 B2 | 8/2006 | Imaizumi | |
| 7,112,952 B2 | 9/2006 | Arai et al. | |
| 7,119,693 B1 | 10/2006 | Devilbiss | |
| 7,129,834 B2 | 10/2006 | Naruse et al. | |
| 7,248,221 B2 | 7/2007 | Kai et al. | |
| 7,250,910 B2 | 7/2007 | Yoshikawa et al. | |
| 7,268,564 B2* | 9/2007 | Ozaki et al. | 324/632 |
| 7,276,929 B2 | 10/2007 | Arai et al. | |
| 7,317,396 B2 | 1/2008 | Ujino | |
| 7,405,664 B2 | 7/2008 | Sakama et al. | |
| 2002/0011967 A1 | 1/2002 | Goff et al. | |
| 2002/0044092 A1 | 4/2002 | Kushihi | |
| 2002/0067316 A1 | 6/2002 | Yokoshima et al. | |
| 2003/0006901 A1 | 1/2003 | Kim et al. | |
| 2003/0020661 A1 | 1/2003 | Sato | |
| 2003/0114118 A1* | 6/2003 | Fukushima et al. | 455/82 |
| 2003/0169153 A1 | 9/2003 | Muller | |
| 2004/0001027 A1 | 1/2004 | Killen et al. | |
| 2004/0066617 A1 | 4/2004 | Hirabayashi et al. | |
| 2004/0125022 A1* | 7/2004 | Fukushima et al. | 343/700 MS |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2005/0092836 A1 | 5/2005 | Kudo | |
| 2005/0099337 A1 | 5/2005 | Takei et al. | |
| 2005/0125093 A1 | 6/2005 | Kikuchi et al. | |
| 2005/0134460 A1 | 6/2005 | Usami | |
| 2005/0138798 A1 | 6/2005 | Sakama et al. | |
| 2005/0140512 A1 | 6/2005 | Sakama et al. | |
| 2005/0232412 A1 | 10/2005 | Ichihara et al. | |
| 2005/0236623 A1 | 10/2005 | Takechi et al. | |
| 2005/0275539 A1 | 12/2005 | Sakama et al. | |
| 2006/0001138 A1 | 1/2006 | Sakama et al. | |
| 2006/0055601 A1 | 3/2006 | Kameda et al. | |
| 2006/0071084 A1 | 4/2006 | Detig et al. | |
| 2006/0109185 A1 | 5/2006 | Iwai et al. | |
| 2006/0145872 A1 | 7/2006 | Tanaka et al. | |
| 2006/0158380 A1 | 7/2006 | Son et al. | |
| 2006/0170606 A1 | 8/2006 | Yamagajo et al. | |
| 2006/0208901 A1 | 9/2006 | Kai et al. | |
| 2006/0220871 A1 | 10/2006 | Baba et al. | |
| 2006/0267138 A1 | 11/2006 | Kobayashi | |
| 2006/0273180 A1* | 12/2006 | Ammond et al. | 235/492 |
| 2007/0004028 A1 | 1/2007 | Lair et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0069037 A1 | 3/2007 | Kawai | |
| 2007/0132591 A1 | 6/2007 | Khatri | |
| 2007/0164414 A1 | 7/2007 | Dokai et al. | |
| 2007/0252700 A1 | 11/2007 | Ishihara et al. | |
| 2007/0252703 A1 | 11/2007 | Kato et al. | |
| 2007/0285335 A1 | 12/2007 | Bungo et al. | |
| 2008/0001822 A1* | 1/2008 | Vesterinen | 343/700 MS |
| 2008/0024156 A1 | 1/2008 | Arai et al. | |
| 2008/0087990 A1 | 4/2008 | Kato et al. | |
| 2008/0169905 A1 | 7/2008 | Slatter | |
| 2008/0238567 A1* | 10/2008 | Rosetti et al. | 333/17.3 |
| 2008/0272885 A1 | 11/2008 | Atherton | |
| 2009/0002130 A1 | 1/2009 | Kato | |
| 2009/0009007 A1 | 1/2009 | Kato et al. | |
| 2009/0065594 A1 | 3/2009 | Kato et al. | |

FOREIGN PATENT DOCUMENTS

| | | |
|---|---|---|
| EP | 1 010 543 A1 | 6/2000 |
| EP | 1 160 915 A2 | 12/2001 |
| EP | 1 170 795 A2 | 1/2002 |
| JP | 50-143451 A | 11/1975 |
| JP | 62-127140 U | 8/1987 |
| JP | 03-262313 A | 11/1991 |
| JP | 04-150011 A | 5/1992 |
| JP | 04-167500 A | 6/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 07-183836 A | 7/1995 |
| JP | 08-056113 A | 2/1996 |
| JP | 8-87580 A | 4/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-505466 A | 5/1998 |
| JP | 10-171954 A | 6/1998 |
| JP | 10-193849 A | 7/1998 |
| JP | 10-293828 A | 11/1998 |
| JP | 11-039441 A | 2/1999 |
| JP | 11-085937 A | 3/1999 |
| JP | 11-102424 A | 4/1999 |
| JP | 11-103209 A | 4/1999 |
| JP | 11-149536 A | 6/1999 |
| JP | 11-149538 A | 6/1999 |
| JP | 11-219420 A | 8/1999 |
| JP | 11-220319 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137785 A | 5/2000 |
| JP | 2000-148948 A | 5/2000 |
| JP | 2000-172812 A | 6/2000 |
| JP | 2000-222540 A | 8/2000 |
| JP | 2000-510271 A | 8/2000 |
| JP | 2000-243797 A | 9/2000 |
| JP | 2000-251049 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 3075400 U | 11/2000 |

(56) References Cited

FOREIGN PATENT DOCUMENTS

| | | |
|---|---|---|
| JP | 2000-349680 A | 12/2000 |
| JP | 2001-028036 A | 1/2001 |
| JP | 2007-18067 A | 1/2001 |
| JP | 2001-043340 A | 2/2001 |
| JP | 2001-66990 A | 3/2001 |
| JP | 2001-505682 A | 4/2001 |
| JP | 2001-168628 A | 6/2001 |
| JP | 2001-188890 A | 7/2001 |
| JP | 2001-240046 A | 9/2001 |
| JP | 2001-256457 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-344574 A | 12/2001 |
| JP | 2001-351084 A | 12/2001 |
| JP | 2001-352176 A | 12/2001 |
| JP | 2002-024776 A | 1/2002 |
| JP | 2002-026513 A | 1/2002 |
| JP | 2002-042076 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-150245 A | 5/2002 |
| JP | 2002-158529 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-522849 A | 7/2002 |
| JP | 2002-230128 A | 8/2002 |
| JP | 2002-252117 A | 9/2002 |
| JP | 2002-259934 A | 9/2002 |
| JP | 2002-298109 A | 10/2002 |
| JP | 2002-308437 A | 10/2002 |
| JP | 2002-319008 A | 10/2002 |
| JP | 2002-362613 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-030612 A | 1/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-187207 A | 7/2003 |
| JP | 2003-187211 A | 7/2003 |
| JP | 2003-188338 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-309418 A | 10/2003 |
| JP | 2003-317060 A | 11/2003 |
| JP | 2003-331246 A | 11/2003 |
| JP | 2003-332820 A | 11/2003 |
| JP | 2004-040597 A | 2/2004 |
| JP | 2004-082775 A | 3/2004 |
| JP | 2004-88218 A | 3/2004 |
| JP | 2004-096566 A | 3/2004 |
| JP | 2004-253858 A | 9/2004 |
| JP | 2004-527864 A | 9/2004 |
| JP | 2004-280390 A | 10/2004 |
| JP | 2004-287767 A | 10/2004 |
| JP | 2004-297249 A | 10/2004 |
| JP | 2004-297681 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-124061 A | 5/2005 |
| JP | 2005-129019 A | 5/2005 |
| JP | 2005-136528 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-275870 A | 10/2005 |
| JP | 2005-284352 A | 10/2005 |
| JP | 2005-295135 A | 10/2005 |
| JP | 2005-311205 A | 11/2005 |
| JP | 2005-321305 A | 11/2005 |
| JP | 2005-335755 A | 12/2005 |
| JP | 2005-346820 A | 12/2005 |
| JP | 2005-352858 A | 12/2005 |
| JP | 2006-025390 A | 1/2006 |
| JP | 2006-031766 A | 2/2006 |
| JP | 2006-39902 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-148518 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-270212 A | 10/2006 |
| JP | 2006-285911 A | 10/2006 |
| JP | 2006-302219 A | 11/2006 |
| JP | 2006-309401 A | 11/2006 |
| JP | 2006-323481 A | 11/2006 |
| JP | 2007-043535 A | 2/2007 |
| JP | 2007-048126 A | 2/2007 |
| JP | 2007-65822 A | 3/2007 |
| JP | 2007-096768 A | 4/2007 |
| JP | 2007-122542 A | 5/2007 |
| JP | 2007-150868 A | 6/2007 |
| JP | 2007-159129 A | 6/2007 |
| JP | 4069958 B2 | 4/2008 |
| JP | 11-175678 A | 1/2009 |
| NL | 9100176 A | 3/1992 |
| NL | 9100347 A | 3/1992 |
| WO | 99/67754 A1 | 12/1999 |
| WO | 00/10122 A2 | 2/2000 |
| WO | 02/061675 A1 | 8/2002 |
| WO | 02/097723 A1 | 12/2002 |

(56) References Cited

FOREIGN PATENT DOCUMENTS

| WO | 03/079305 A1 | 9/2003 |
|---|---|---|
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/115849 A1 | 12/2005 |
| WO | 2006/045682 A | 5/2006 |
| WO | 2007/083574 A1 | 7/2007 |
| WO | 2007/125683 A1 | 11/2007 |
| WO | 2007/138857 A1 | 12/2007 |

OTHER PUBLICATIONS

Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Official Communication issued in corresponding European Patent Application No. 08740327.5, mailed on Jul. 9, 2010.

\* cited by examiner

WIRELESS IC DEVICE

BACKGROUND OF THE INVENTION

1. Field of the Invention

The present invention relates to wireless IC devices, and in particular, relates to wireless IC devices such as non-contact wireless IC media and non-contact wireless IC tags used in, for example, Radio Frequency Identification (RFID) systems.

2. Description of the Related Art

To date, various wireless IC devices on which wireless IC chips are mounted have been proposed.

Japanese Unexamined Patent Application Publication No. 2002-298109, for example, discloses a non-contact wireless IC medium produced by the following steps. First, as shown in a cross-sectional view in FIG. 4A, an antenna portion 103 is formed on a separable sheet 101 using conductive paste, conductive ink, or the like, and an IC chip 109 is mounted on the antenna portion 103 so as to be electrically connected to the antenna portion 103. Next, as shown in a cross-sectional view in FIG. 4B, an adhesive sheet 111 is closely adhered to the antenna portion 103 and the IC chip 109. Finally, as shown in a cross-sectional view in FIG. 4C, the separable sheet 101 is stripped off.

The non-contact wireless IC medium is used while the adhesive sheet 111 is adhered to an article and the IC chip 101 is exposed to the outside. Therefore, when the article to which the non-contact wireless IC medium is adhered is brought into contact with other articles, the shock can directly act on the IC chip 109, and the IC chip 109 can be damaged. This can lead to malfunction of the wireless IC medium.

SUMMARY OF THE INVENTION

Accordingly, the present invention provides a wireless IC device including a wireless IC chip having a structure that prevents a shock from the outside, for example, from being applied directly on the wireless IC chip.

According to a preferred embodiment of the present invention, a wireless IC device includes a radiating plate, a wireless IC chip, and a feeder circuit board on which the wireless IC chip is mounted, the feeder circuit board including a feeder circuit having a resonant circuit with an inductance element and/or a matching circuit, the feeder circuit board being electromagnetically coupled with the radiating plate. The wireless IC chip is interposed between the radiating plate and the feeder circuit board.

With the above-described structure, the wireless IC chip is not used while being exposed to the outside. Thus, shock from the outside, for example, acts on the wireless IC chip via the radiating plate or the feeder circuit board. Since the shock from the outside, for example, does not directly act on the wireless IC chip, the wireless IC chip is prevented from being damaged or being made inoperable.

It is preferable that the radiating plate and the feeder circuit board be joined to each other at a periphery of the wireless IC chip when viewed in a direction perpendicular or substantially perpendicular to a surface of the feeder circuit board on which the wireless IC chip is mounted.

In this case, the radiating plate and the feeder circuit board can be joined together while being in contact with each other or via an adhesive or other suitable joining material or member. Since the periphery of the wireless IC chip is covered with the radiating plate and/or the feeder circuit board, water or the like is prevented from infiltrating into the wireless IC chip, resulting in an improvement in the reliability of the wireless IC device.

Moreover, since the distance between the radiating plate and the feeder circuit board is reduced, the efficiency of electromagnetic coupling is improved, and size reduction of the device, for example, is facilitated.

It is preferable that the radiating plate be adhered to an article at a surface remote from the feeder circuit board and the wireless IC chip.

In this case, the wireless IC chip in the wireless IC device adhered to the article is located at an outer position of the radiating plate. However, the wireless IC chip is covered with the feeder circuit board, and is protected.

It is preferable that the wireless IC device further include a resin component disposed between the radiating plate and the feeder circuit board at at least the periphery of the wireless IC chip when viewed in the direction perpendicular or substantially perpendicular to the surface of the feeder circuit board on which the wireless IC chip is mounted.

In this case, at least the periphery of the wireless IC chip is surrounded by the resin component, water or the like is prevented from infiltrating into the wireless IC chip, resulting in an improvement in the reliability of the wireless IC device.

Another resin component can also be disposed between the radiating plate and the wireless IC chip such that a surface, remote from the feeder circuit board, of the wireless IC chip is covered.

It is preferable that the wireless IC chip be electrically insulated from the radiating plate.

It is preferable that at least one of the radiating plate and the feeder circuit board be formed of a flexible substrate.

In this case, the wireless IC device can be produced continuously and efficiently using the flexible substrate, and the size thereof can also be reduced easily. Moreover, the feeder circuit board and/or the radiating plate can be formed such that the wireless IC device is adhered to a curved surface of an article or such that the wireless IC chip is covered.

It is preferable that the wireless IC chip be in contact with the radiating plate at a surface remote from the feeder circuit board.

In this case, the height of the wireless IC device can be reduced by removing the gap between the wireless IC chip and the radiating plate.

When a radiating-electrode pattern is formed on a base of the radiating plate, the wireless IC chip may be brought into contact with the radiating-electrode pattern or the base.

According to various preferred embodiments of the present invention, shock from the outside, for example, does not directly act on the wireless IC chip. Thus, the wireless IC chip is prevented from being damaged or being made inoperable, resulting in an improvement in the reliability of the wireless IC device.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will now be described with reference to FIGS. 1A to 3.

First Preferred Embodiment

Figure 1A:
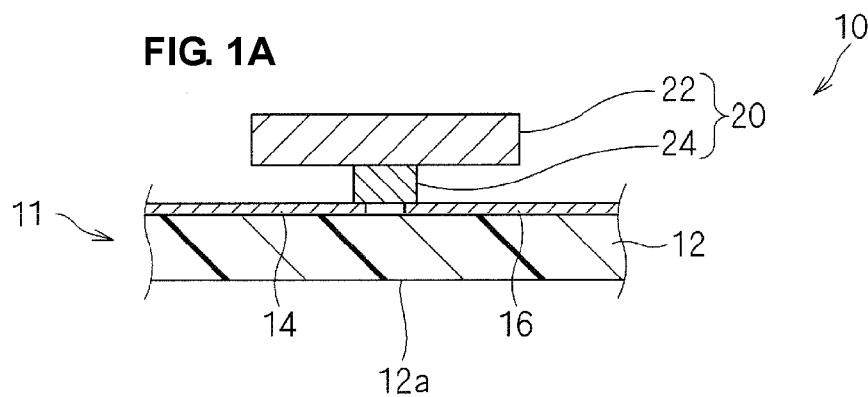
FIGS. 1A, 1B and 1C are cross-sectional views of a principal portion of a wireless IC device according to a first preferred embodiment of the present invention.

A wireless IC device according to a first preferred embodiment will be described with reference to FIGS. 1A to 2. FIGS. 1A to 1C are cross-sectional views of a principal portion of the wireless IC device.

As shown in FIG. 1A, a wireless IC device 10 includes a radiating plate 11 and an electromagnetically coupled module 20 mounted thereon. The radiating plate 11 includes a base 12 and radiating-electrode patterns 14 and 16 located thereon. The electromagnetically coupled module 20 includes a feeder circuit board 22 and a wireless IC chip 24 mounted thereon.

The wireless IC chip 24 is disposed between the radiating plate 11 and the feeder circuit board 22. In order to realize a low-profile device by removing the gap between the wireless IC chip 24 and the radiating plate 11, the wireless IC chip 24 is in contact with the radiating-electrode patterns 14 and 16 or the base 12 of the radiating plate 11.

Although the radiating plate 11 and the feeder circuit board 22 are spaced apart from each other, these components are electromagnetically coupled (via an electric field, a magnetic field, or both electric and magnetic fields). For example, the feeder circuit board 22 is preferably formed of, for example, a multilayer substrate or a flexible substrate, and an inductance element is disposed inside or outside the feeder circuit board 22 such that magnetic fields generated by the inductance element and the radiating plate 11 are coupled.

Since a portion of the feeder circuit board 22 protruding from the wireless IC chip 24 directly faces the radiating plate 11, the electromagnetic coupling between the feeder circuit board 22 and the radiating plate 11 can be facilitated by forming a wiring electrode of the inductance element on the protruding portion.

However, since the wireless IC chip 24 is a dielectric formed on, for example, a silicon substrate and electromagnetic waves can pass therethrough, the inductance element can be formed on a portion of the feeder circuit board 22 overlapped with the wireless IC chip 24.

Since the radiating plate 11 and the feeder circuit board 22 are electromagnetically coupled and the wireless IC chip 24 and the radiating plate 11 are not electrically connected, current does not flow from the radiating plate 11 to the wireless IC chip 24 even when static electricity is generated in the radiating plate 11. That is, the portion at which the radiating plate 11 and the feeder circuit board 22 are electromagnetically coupled is designed for high-frequency application, and static electricity, which is an energy wave whose frequency is less than or equal to approximately 200 MHz, does not flow through the portion. Consequently, the wireless IC chip 24 is not easily broken or damaged by static electricity.

Since it is not necessary for the feeder circuit board 22 and the radiating plate 11 to be electrically connected, the electromagnetically coupled module 20 can be mounted on the base 12 using an insulating adhesive, for example. Various types of components, for example, metal foil or evaporated electrodes can be used for the radiating plate 11. In this manner, the material can be freely selected depending on the application of the wireless IC device 10.

A feeder circuit including a resonant circuit with a predetermined resonant frequency is embedded in the feeder circuit board 22. In the present invention, the predetermined resonant frequency refers to an operating frequency at which the electromagnetically coupled module 20 operates as a wireless IC device. The feeder circuit matches characteristic impedances of the radiating plate 11 and the wireless IC chip 24. Moreover, the radiating plate 11 radiates transmitted signals supplied from the feeder circuit board 22 via electromagnetic coupling into the air, and supplies received signals to the feeder circuit via electromagnetic coupling.

The wireless IC chip 24 is interposed between the feeder circuit board 22 and the radiating plate 11 and is protected. That is, shock from the outside, for example, acts on the wireless IC chip 24 via the feeder circuit board 22 or the radiating plate 11, and does not directly act on the wireless IC chip 24.

Figure 1B:
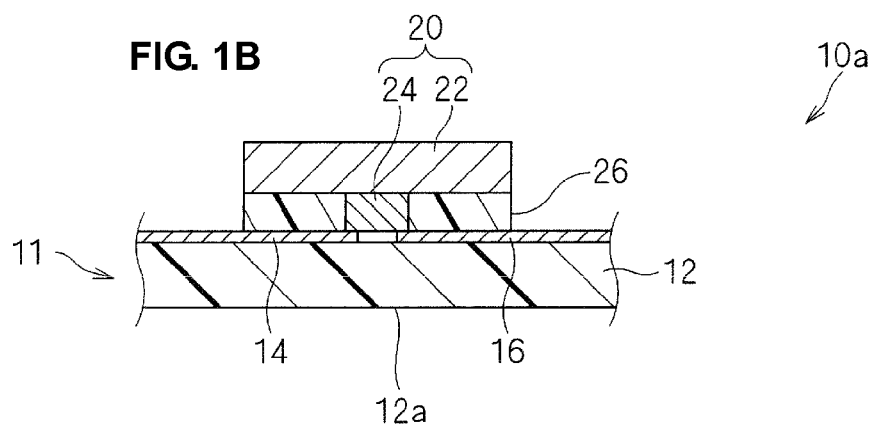

As in a wireless IC device 10a shown in FIG. 1B, a molded resin component 26 can be disposed between the portion of the feeder circuit board 22 protruding from the wireless IC chip 24 and the radiating plate 11 so as to surround the wireless IC chip 24. Furthermore, although not shown, the radiating plate 11 and the wireless IC chip 24 can be spaced apart from each other, and another molded resin component can be interposed between the radiating plate 11 and the wireless IC chip 24.

The molded resin component 26 surrounding the wireless IC chip 24 can prevent water or the like from infiltrating into the wireless IC chip 24, resulting in an improvement in the reliability of the wireless IC device 10a.

Figure 1C:
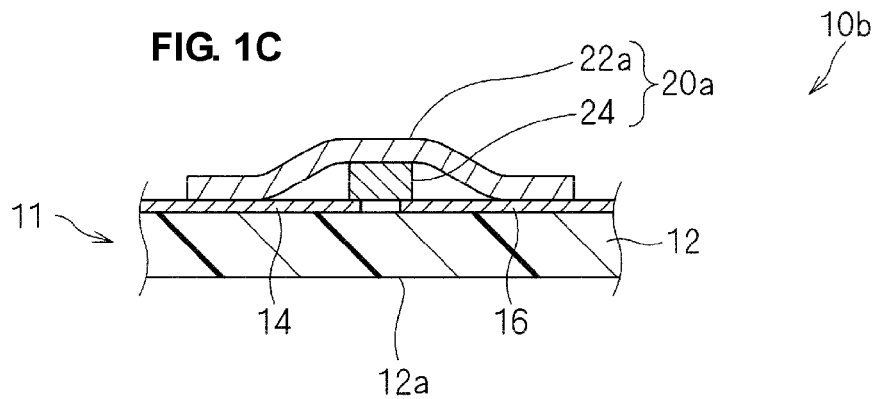

As in a wireless IC device 10b shown in FIG. 1C, a portion of a feeder circuit board 22a protruding from the wireless IC chip can be joined to the radiating plate 11 along the side surfaces of the wireless IC chip 24 so as to surround the wireless IC chip 24. The feeder circuit board 22a can be in contact with the radiating-electrode patterns 14 and 16, or can be spaced apart from the radiating-electrode patterns 14 and 16. The feeder circuit board 22a can be easily formed when a flexible substrate, for example, is used for the feeder circuit board 22a.

Since the distance between the radiating plate 11 and the feeder circuit board 22a is reduced, the efficiency of electromagnetic coupling is improved, and size reduction of the device, for example, is facilitated.

The wireless IC devices 10, 10a, and 10b are each used while a surface 12a, remote from the electromagnetically coupled modules 20 and 20a, of the base 12 included in the radiating plate 11 is adhered to an article.

Figure 2:
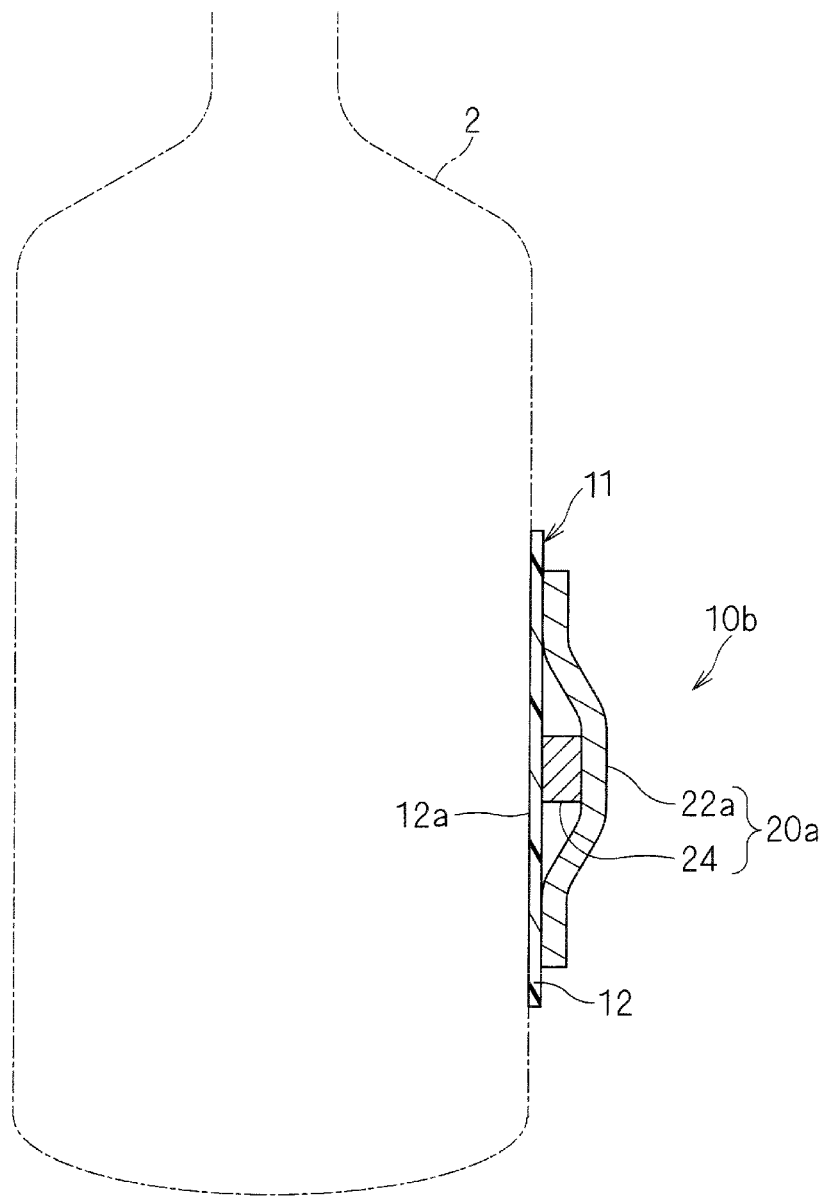
FIG. 2 is a cross-sectional view when the wireless IC device is in use according to the first preferred embodiment of the present invention.

For example, as shown in a cross-sectional view in FIG. 2, the wireless IC device 10b is used while the surface 12a, which is remote from the electromagnetically coupled module 20a, of the base 12 included in the radiating plate 11 is adhered to an article 2, and the electromagnetically coupled module 20a is exposed to the outside. At this time, the wireless IC chip 24 is interposed between the radiating plate 11 and the feeder circuit board 22a and covered with the feeder circuit board 22a so as not to be exposed to the outside. Thus, the wireless IC chip 24 is protected from, for example, shock from the outside.

When the article 2 to which the wireless IC device 10b is adhered is a metal product such as an aluminum bottle, signals are radiated from the radiating plate 11 to the metal, and the metal product itself functions as a radiator. When the article 2 is an insulator such as a plastic bottle, the insulator itself can also function as a radiator by setting the impedance of a matching circuit in the feeder circuit board 22a so as to be the same as that determined by the dielectric constant of the insulator.

In FIG. 2, the radiating-electrode patterns formed on the base 12 are not shown. However, the radiating-electrode patterns can be formed on a surface of the base 12 adjacent to the electromagnetically coupled module 20a or on the surface 12a adjacent to the article 2. In particular, when the radiating-electrode patterns are formed on the surface 12a adjacent to the article 2, electromagnetic waves radiated from the radiating-electrode patterns can be efficiently transmitted to the article 2.

When a flexible substrate is used for the radiating plate 11, the wireless IC devices 10, 10a, and 10b can be easily adhered to, for example, curved surfaces of the article 2. Moreover, the wireless IC devices can be produced continuously and efficiently, and the size thereof can also be reduced easily.

Second Preferred Embodiment

Figure 3:
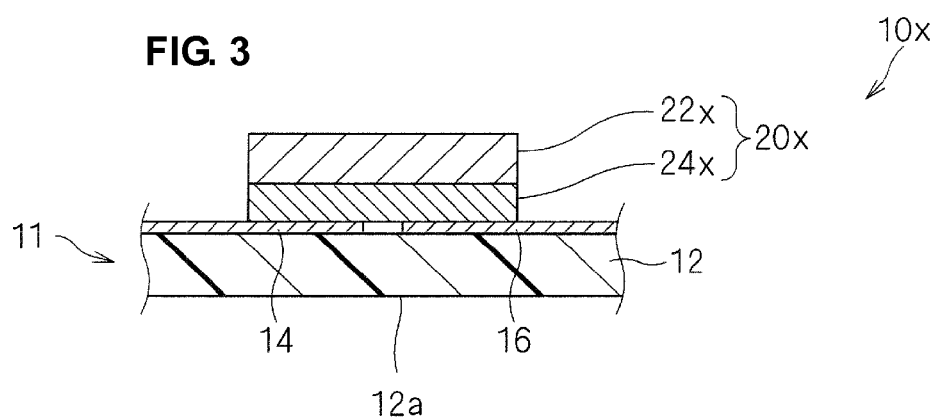
FIG. 3 is a cross-sectional view of a principal portion of a wireless IC device to a second preferred embodiment of the present invention.
Figure 4A:
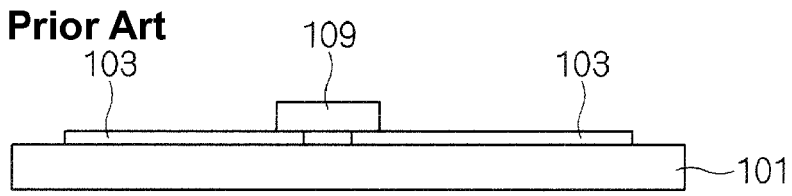
FIGS. 4A, 4B and 4C are cross-sectional views illustrating a production process of a known wireless IC device.
Figure 4B:
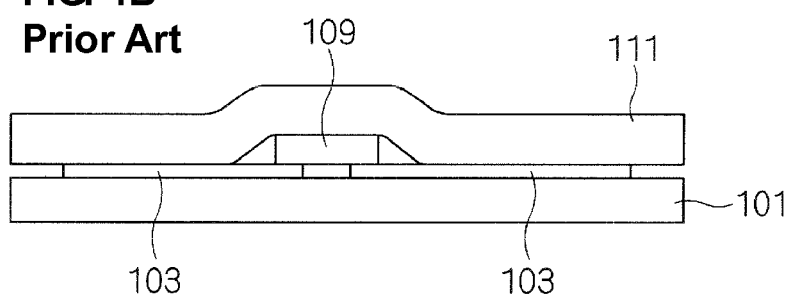
Figure 4C:
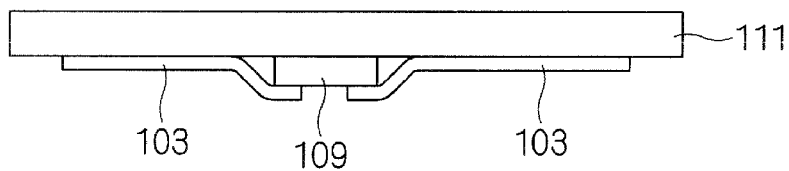

A wireless IC device 10x according to a second preferred embodiment will now be described with reference to a cross-sectional view of a principal portion shown in FIG. 3.

The wireless IC device 10x according to the second preferred embodiment includes a radiating plate 11 having a base 12 and radiating-electrode patterns 14 and 16 located thereon and an electromagnetically coupled module 20x mounted on the radiating plate 11 using an adhesive or other suitable joining material or member, as in the first preferred embodiment.

Unlike the first preferred embodiment, the sizes and the dimensions of a feeder circuit board 22x and a wireless IC chip 24x of the electromagnetically coupled module 20x are substantially the same, and the feeder circuit board 22x does not have a portion protruding from the wireless IC chip 24x.

Since the wireless IC chip 24x is a dielectric formed on, for example, a silicon substrate and electromagnetic waves can pass therethrough, the electromagnetic field can be expanded in the thickness direction of the wireless IC chip 24x, and the feeder circuit board 22x and the radiating-electrode patterns 14 and 16 can be electromagnetically coupled via the wireless IC chip 24x.

As in the first preferred embodiment, the wireless IC chip 24x in the wireless IC device 10x according to the second preferred embodiment is also protected from, for example, static electricity and shock from the outside.

As described above, shock from the outside, for example, does not directly act on the wireless IC chip since the wireless IC chip is interposed between the feeder circuit board and the radiating plate. In this manner, the wireless IC chip is prevented from being damaged or being made inoperable, resulting in an improvement in the reliability of the wireless IC device.

Moreover, since the radiating plate and the feeder circuit board are electromagnetically coupled and the wireless IC chip and the radiating plate are not electrically connected, the wireless IC chip is not broken or damaged by the static electricity generated in the radiating plate. In this manner, countermeasures against static electricity can be enhanced.

The present invention is not limited to the above-described preferred embodiments, and various modifications are possible.

For example, the radiating plate and the feeder circuit board can be electromagnetically coupled using only an electric field or only a magnetic field instead of using electromagnetic waves.

Moreover, the feeder circuit of the feeder circuit board can include (a) a matching circuit in addition to the resonant circuit including the inductance element, (b) a matching circuit but not the resonant circuit including the inductance element, or (c) the resonant circuit including the inductance element but not a matching circuit.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wireless IC device comprising:
 a radiating plate;
 a wireless IC chip; and
 a feeder circuit board on which the wireless IC chip is mounted, the feeder circuit board including a feeder circuit that includes a matching circuit which matches characteristic impedances of the radiating plate and the wireless IC chip, the matching circuit including an inductance element, the inductance element being coupled with the radiating plate; wherein
 the wireless IC chip is interposed between the radiating plate and the feeder circuit board, and the radiating plate and the feeder circuit board are joined to each other via the wireless IC chip;
 the radiating plate is adhered to an article at a surface of the radiating plate on a side opposite to a side of the radiating plate on which the feeder circuit board and the wireless IC chip are disposed; and
 the feeder circuit board completely covers the wireless IC chip and at least a portion of the radiating plate such that no portion of the wireless IC chip is exposed to the outside and the wireless IC chip is protected from shock from the outside.

2. The wireless IC device according to claim 1, wherein the radiating plate and the feeder circuit board are joined to each other at a periphery of the wireless IC chip when viewed in a direction perpendicular or substantially perpendicular to a surface of the feeder circuit board on which the wireless IC chip is mounted.

3. The wireless IC device according to claim 1, further comprising:
 a resin component disposed between the radiating plate and the feeder circuit board at at least the periphery of the wireless IC chip when viewed in the direction perpendicular or substantially perpendicular to the surface of the feeder circuit board on which the wireless IC chip is mounted.

4. The wireless IC device according to claim 1, wherein the wireless IC chip is electrically insulated from the radiating plate.

5. The wireless IC device according to claim 1, wherein at least one of the radiating plate and the feeder circuit board is made of a flexible substrate.

6. The wireless IC device according to claim 1, wherein the wireless IC chip is in contact with the radiating plate at a surface remote from the feeder circuit board.

7. The wireless IC device according to claim 1, wherein the feeder circuit is electrically coupled with the radiating plate.

8. The wireless IC device according to claim 1, wherein the feeder circuit is magnetically coupled with the radiating plate.

9. The wireless IC device according to claim 1, wherein the feeder circuit is electrically and magnetically coupled with the radiating plate.

10. The wireless IC device according to claim 1, further comprising a molded resin component which is interposed between the radiating plate and the wireless IC chip.

11. The wireless IC device according to claim 1, the feeder circuit board is a multilayer substrate, and the inductance element is disposed inside the multilayer substrate.

12. The wireless IC device according to claim 10, wherein the radiating plate and the feeder circuit board are joined to each other at a periphery of the wireless IC chip when viewed in a direction perpendicular or substantially perpendicular to a surface of the feeder circuit board on which the wireless IC chip is mounted.

13. The wireless IC device according to claim 10, wherein the radiating plate is adhered to an article at a surface remote from the feeder circuit board and the wireless IC chip.

14. The wireless IC device according to claim 10, wherein at least one of the radiating plate and the feeder circuit board is made of a flexible substrate.

15. The wireless IC device according to claim 10, wherein the feeder circuit is electrically coupled with the radiating plate.

16. The wireless IC device according to claim 10, wherein the feeder circuit is magnetically coupled with the radiating plate.

17. The wireless IC device according to claim 10, wherein the feeder circuit is electrically and magnetically coupled with the radiating plate.

\* \* \* \* \*